US010619778B2

(12) United States Patent
Keil et al.

(10) Patent No.: US 10,619,778 B2
(45) Date of Patent: Apr. 14, 2020

(54) PIPE RAM JOINT

(71) Applicant: Northwest Pipe Company, Vancouver, WA (US)

(72) Inventors: Brent Keil, Vancouver, WA (US); Frederick Gobler, Adelanto, CA (US)

(73) Assignee: Northwest Pipe Company, Vancouver, WA (US)

( * ) Notice: Subject to any disclaimer, the term of this patent is extended or adjusted under 35 U.S.C. 154(b) by 562 days.

(21) Appl. No.: 15/589,608

(22) Filed: May 8, 2017

(65) Prior Publication Data

US 2017/0321834 A1 Nov. 9, 2017

Related U.S. Application Data

(60) Provisional application No. 62/333,072, filed on May 6, 2016.

(51) Int. Cl.
*F16L 37/084* (2006.01)
*E21B 17/02* (2006.01)

(52) U.S. Cl.
CPC ............ *F16L 37/084* (2013.01); *E21B 17/02* (2013.01)

(58) Field of Classification Search
CPC .................. F16L 37/084; E21B 17/02
See application file for complete search history.

(56) References Cited

U.S. PATENT DOCUMENTS

| 672,180 A | * | 4/1901 | Read |
| 786,929 A | | 4/1905 | Williams |
| 2,257,335 A | | 9/1941 | Evans et al. |
| 2,893,759 A | | 7/1959 | Blose |
| 3,074,292 A | | 1/1963 | Polmon |
| 3,096,105 A | | 7/1963 | Risley |
| 3,114,566 A | | 12/1963 | Coberly et al. |
| 3,640,552 A | * | 2/1972 | Demler, Sr. .......... F16L 37/084 285/110 |
| 3,751,077 A | | 8/1973 | Hiszpanski |
| 3,751,792 A | | 8/1973 | Frakes |
| 3,774,296 A | | 11/1973 | Clay |
| 3,784,235 A | | 1/1974 | Kessler et al. |
| RE29,376 E | | 8/1977 | Hiszpanski |

(Continued)

FOREIGN PATENT DOCUMENTS

| DE | 202014003776 U1 * | 5/2014 | .......... B29C 65/3476 |
| WO | WO-9613681 A1 * | 5/1996 | .......... E21B 17/0426 |

OTHER PUBLICATIONS

Chow; "Snap-fit design concepts"; Modern Plastics; Aug. 1977; pp. 56-59.

(Continued)

*Primary Examiner* — James M Hewitt, II
(74) *Attorney, Agent, or Firm* — Klarquist Sparkman, LLP

(57) ABSTRACT

A pipe ram joint includes first and second couplers that can comprise rings for mounting to the ends of respective pipes or formed in the ends of these pipes. The first coupler can comprise a female ring with a first tooth adjacent to a distal end thereof and a first groove spaced from the distal end. The second coupler can comprise a male ring with a respect second tooth and second groove. When the pipes are rammed together, the first tooth is positioned in the second groove and the second tooth is positioned in the first groove. The couplers have features that reduce the force required to ram the pipe sections together.

30 Claims, 6 Drawing Sheets

(56) References Cited

U.S. PATENT DOCUMENTS

| | | |
|---|---|---|
| 4,091,630 A | 5/1978 | Nemoto et al. |
| 4,124,232 A | 11/1978 | Ahlstone |
| 4,214,358 A | 7/1980 | Clerc |
| 4,275,907 A | 6/1981 | Hunt |
| 4,298,221 A | 11/1981 | McGugan |
| 4,341,481 A | 7/1982 | Wollensak |
| 4,525,001 A | 6/1985 | Lumsden et al. |
| 4,629,221 A | 12/1986 | Lumsden et al. |
| 4,687,368 A | 8/1987 | Eklof et al. |
| 4,728,236 A | 3/1988 | Kraus |
| 4,779,902 A | 10/1988 | Lee |
| 4,790,573 A | 12/1988 | Cardozo |
| 4,817,997 A | 4/1989 | Ingram |
| 4,919,461 A | 4/1990 | Reynolds |
| 4,958,959 A | 9/1990 | Onge |
| 5,015,014 A | 5/1991 | Sweeney |
| 5,104,263 A | 4/1992 | Shibahara et al. |
| 5,360,242 A | 11/1994 | Argent |
| 5,921,591 A | 7/1999 | Argent |
| 7,648,176 B2 | 1/2010 | Van Bilderbeek |
| 2006/0170213 A1* | 8/2006 | Mittler .................... E21B 17/04 285/328 |
| 2013/0161027 A1* | 6/2013 | Inglis ...................... B23B 31/20 166/381 |

OTHER PUBLICATIONS

Wuebken, et al.; "Designing for snap fits, part 1"; Plastics Design Forum; May/Jun. 1984; 3 pages.

McIntyre; "Designing for snap fits, part 2"; Plastics Design Forum; Jul./Aug. 1984; 5 pages.

McIntyre; "Designing for snap fits, part 3"; Plastics Design Forum; Sep./Oct. 1984; 4 pages.

Case study; "Almost instant sewer replacement at Blisworth"; Russell Smith; pre-1994; 2 pages.

Aardvark Corporation advertisement for "Barbvark quick connect pipe joints"; pre-1994; one page.

\* cited by examiner

PIPE RAM JOINT

CROSS REFERENCE TO RELATED APPLICATION

This application claims the benefit of U.S. Provisional Application Ser. No. 62/333,072, entitled PIPE RAM JOINT, filed on May 6, 2016.

TECHNICAL FIELD

This disclosure relates to pipe ram joints as well as pipe assemblies utilizing ram joints; including ram joint assemblies for relatively large diameter pipes, such as those that are three to eight feet in diameter or larger. This disclosure also relates to pipe ram joint components that can be attached to pipe ends to form a joint when the pipe ends with the joint components are rammed together.

BACKGROUND

Pipe ramming is a known method for installing steel pipes and casings underground without the use of trenches. The method is particularly useful for installations in areas where other methods might lead to surface settling, such as under roads or train tracks.

The process of pipe ramming is fairly uncomplicated. A casing pipe is typically positioned on rails or some other stable platform and positioned in a desired alignment for pushing through the soil. A cutting shoe may be positioned on the leading end of the pipe. The pipe is then driven, such as using a pneumatic hammer, through the soil. As the open ended pipe casing is hammered, soil enters the casing. This soil is typically cleaned out following pipe installation. As the pipe casing is pushed further into the soil, in one known approach, the ends of additional pipe lengths are welded or otherwise attached to the tail end of the driven pipe to lengthen the driven pipe as required for the leading end to reach the desired exit or destination location.

Although pipe ram joints are known, a need exists for an improved ram joint to interconnect pipe sections or lengths, and in particular for joints and joint components that facilitate rapid attachment of pipe lengths and that more efficiently transfer energy to the leading end of the lead pipe during ramming through the soil.

SUMMARY

A pipe ram joint includes first and second couplers that can comprise rings for mounting to the ends of respective pipes or that are formed in the ends of these pipes. The first coupler can comprise a female ring with a first tooth adjacent to a distal end thereof and a first groove spaced from the distal end. The second coupler can comprise a male ring with a respect second tooth and second groove. When the pipes are rammed together, the first tooth is positioned in the second groove and the second tooth is positioned in the first groove. The couplers have one or more features that reduce the force required to ram the pipe sections together.

As one aspect of this disclosure, a pipe ram joint for joining first and second pipes together can comprise an annular first coupler having a first longitudinal axis, the first coupler being mounted to or formed in a first end of the first pipe, and an annular second coupler having a second longitudinal axis, the second coupler being formed in or mounted to a second end of the second pipe. These couplers can be in the form of rings that are provided separate from or mounted to respective pipe ends. The first coupler comprises a first distal end, an annular first outer wall and an annular first inner wall and a first distal end that defines a first pipe receiving opening. The second coupler comprises a second distal end, an annular second outer wall and an annular second inner wall, the second distal end and second coupler being sized for insertion into the first pipe receiving opening and into the first coupler to join the first and second pipes together. The first inner wall can comprise an annular first groove spaced from the first distal end, and an annular first tooth positioned nearer to the first distal end than the first annular groove. The first groove has first and second annular groove side walls and a first groove base wall, the first groove side wall being further from the first distal end than the second groove side wall. In addition, the first groove side wall can be angled toward the first distal end at a first acute angle relative to a plane perpendicular to the first longitudinal axis in a direction moving away from the first groove base wall. In addition, the first tooth has first and second annular tooth side walls and a first tooth outer wall, the first tooth side wall being positioned further from the first distal end than the second tooth side wall, the second tooth side wall can comprise a first tooth side wall groove wall engaging surface that can be angled toward the distal end at a third acute angle relative to a plane perpendicular to the first longitudinal axis in a direction moving away from the first outer wall. The second outer wall comprises an annular second groove spaced from the second distal end, and an annular second tooth positioned nearer to the second distal end than the second annular groove. The second groove has third and fourth annular groove side walls and a second groove base wall, the fourth groove side wall being further from the second distal end than the third groove side wall. The fourth groove side wall can be angled toward the second distal end at a second acute angle relative to a plane perpendicular to the first longitudinal axis in a direction moving away from the second groove base wall. In addition, the second tooth has third and fourth annular tooth side walls and a second tooth outer wall, the fourth tooth side wall being positioned further from the second distal end than the third tooth side wall. The fourth tooth side wall can comprise a second tooth side wall groove wall engaging surface angled toward the distal end at a fourth acute angle relative to a plane perpendicular to the first longitudinal axis in a direction moving away from the second inner wall. The first tooth is sized for positioning in the second groove with at least a portion of the first side wall groove wall engaging surface abutting the fourth groove side wall and the second tooth is sized for positioning in the first groove with at least a portion of the second tooth side wall groove wall engaging surface abutting the first side wall.

In accordance with another aspect of this disclosure, the first tooth can have a shorter length than the length of the second tooth.

As a still further aspect of this disclosure, the radius of at least a first portion of the first groove from the first longitudinal axis can increase at a first rate moving from the first groove side wall toward the second groove side wall along the first portion of the first groove. In addition, the radius of at least a second portion of the second tooth from the second longitudinal axis can increase at a second rate that is greater than the first rate moving from the fourth tooth surface toward the third tooth wall along the second portion of the second tooth. As another aspect, the first groove base wall can be sloped at a first angle away from the first longitudinal axis from the first groove side wall toward the second groove side wall and second tooth outer wall can be sloped at a second angle away from the second longitudinal axis from the fourth tooth side wall toward the third tooth side wall. The second angle can be greater than the first angle.

As a still further aspect, at least the majority of, or the entirety of the first groove base wall can be concave and at least a majority of, or the entirety of the second tooth outer wall can be convex.

As yet another aspect, the third acute angle of the first tooth groove wall engaging surface can be less than the second acute angle of the fourth groove wall. As an example, the third acute angle can be about ninety percent of the second acute angle.

As another aspect, length of the first tooth outer wall in the direction of the first longitudinal axis can be greater than the length of the second groove base wall in the direction of the second longitudinal axis. With this construction, and with the first tooth positioned in the second groove, a gap exists between the first tooth outer wall and the second groove base wall.

As a further aspect, the first and second pipes have respective first and second ends. The first coupler can comprise a first ring adapted to be mounted to a first end of the first pipe and the second coupler can comprise a second ring adapted to be mounted to the second end of the second pipe. Alternatively, a first of the first couplers can be formed in or mounted to the first end of the first pipe and a second of the first couplers can be formed in or mounted to the first end of the second pipe; and a first of the second couplers can be formed in or mounted to the second end of the first pipe and a second of the second couplers can be formed in or mounted to the second end of the second pipe.

As another aspect, the couplers individually, and in male and female pairs, apart from pipes are within the scope of this disclosure.

Other features and aspects of this disclosure will become apparent from the description and drawings. The invention encompasses all novel and non-obvious combinations and sub-combinations of these features and does not require all of the features or advantages to be included or satisfied to be within the scope of this invention.

BRIEF DESCRIPTION OF THE DRAWINGS

FIG. 1 is a sectional view through a portion of an annular female coupler in the form of a ring, which can be referred to as an OD ring, which can be attached to, for example, the leading end of a pipe to be added to a driven pipe. FIG. 2 is a sectional view of a portion of an annular male coupler in the form of a ring, which can be referred to as an ID ring, that can be attached to, for example, the trailing end of a pipe section.

DETAILED DESCRIPTION

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phrase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises". Also, the terms "including" and "having" have the same meaning as "comprising". The term "about" means within plus or minus five percent of the stated value. In addition, the term majority shall mean between over fifty percent and up to one hundred percent. It is to be understood that any dimensions and angles set forth in this disclosure are exemplary.

Any suitable durable material can be used for the pipes and pipe joint forming couplers disclosed herein, such as, for example, steel, with ASTM A36 carbon structural steel being one specific example.

Figure 2:
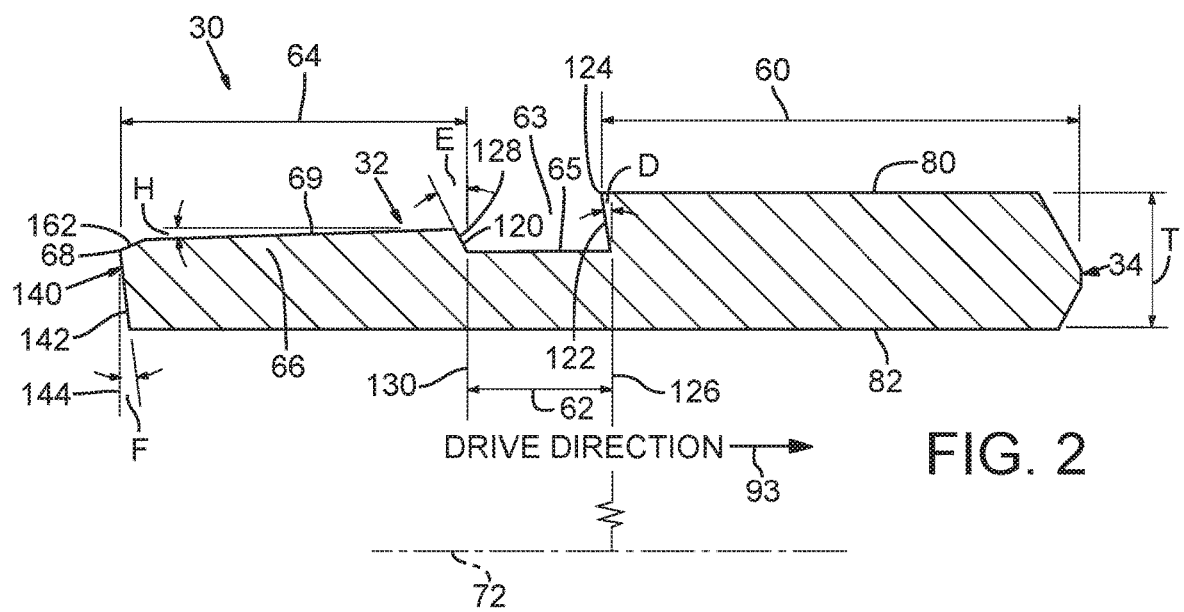
Figure 3:
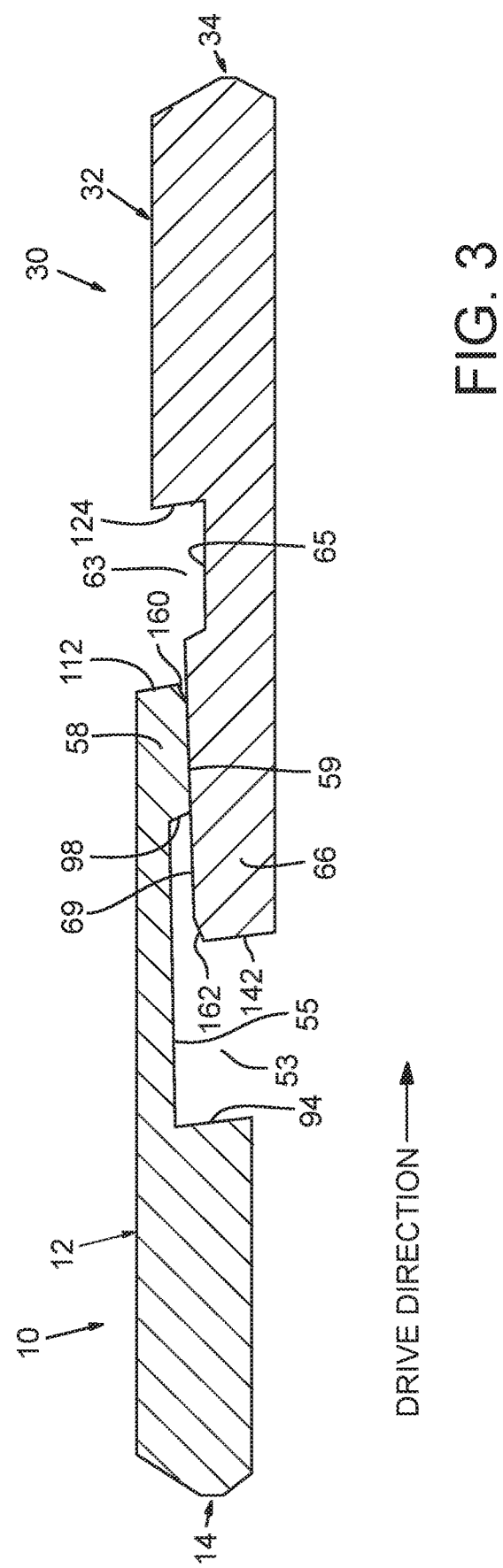
FIG. 3 is an exemplary embodiment of the rings of FIGS. 1 and 1 that are slidably engaged with one another and that are in the process of being rammed together to join them and to join pipe sections together to which the rings are mounted.
Figure 4:
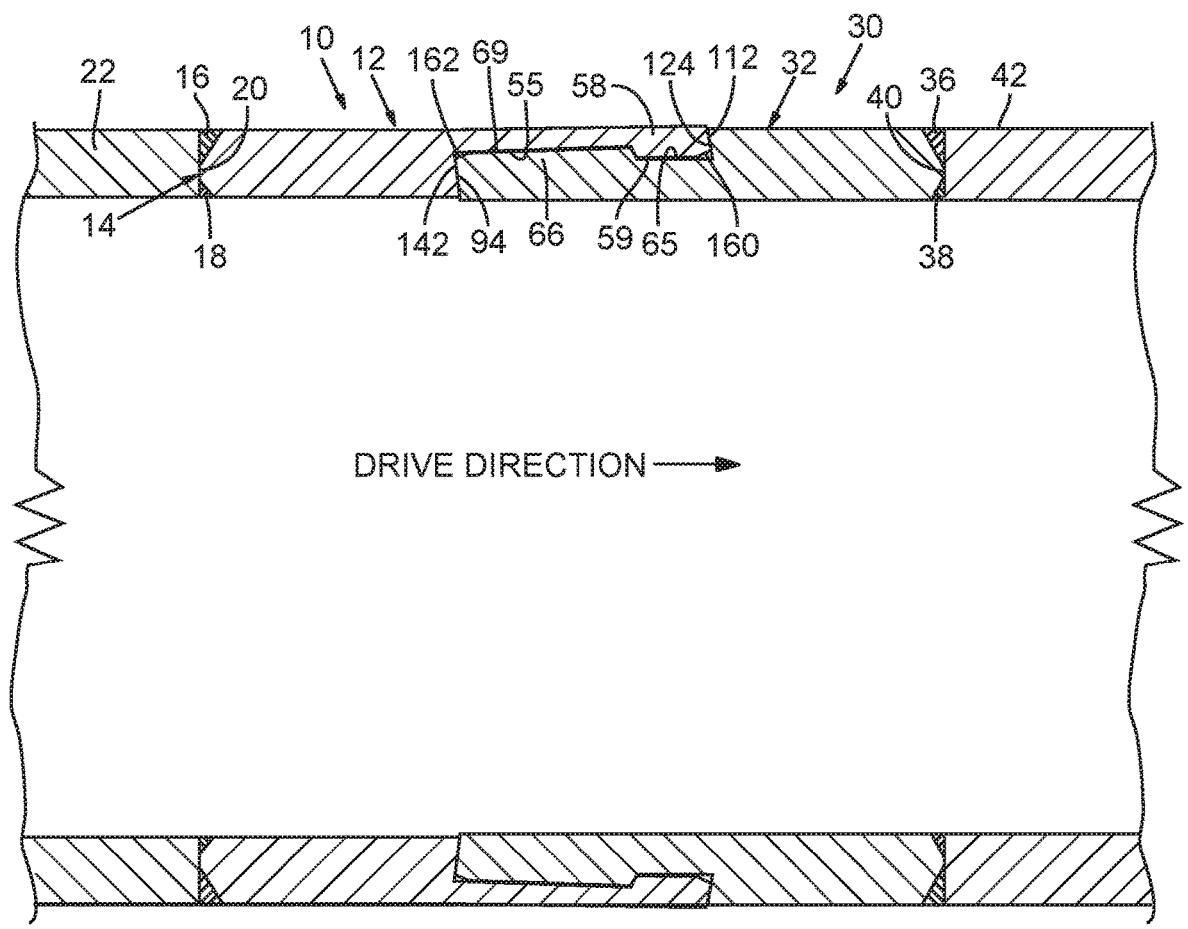
FIG. 4 is an exemplary embodiment of the rings of FIGS. 1 and 2 shown mounted to respective adjacent ends of first and second pipes after the rings have been interconnected.

Referring to FIGS. 1 through 5, a first exemplary embodiment of pipe ram joint couplers is illustrated. An annular first coupler 10, shown in the form of a first annular ring 12, which constitutes an outer or OD ring, is desirably circular in cross-section. A proximal end 14 ("proximal" means at the pipe end to which it is to be connected) desirably has converging weld surfaces for use in welding (e.g., butt welding) end 14 to the end of a pipe section to thereby attach ring 12 to the pipe section. FIG. 4 illustrates end 14 connected by welds 16, 18 to a first end 20 of a first pipe 22. An annular second coupler 30, shown in the form of a second annular ring 32, which constitutes an inner or ID ring, is also desirably circular in cross section. A proximal end 34 desirably has converging weld surfaces for use in welding (e.g., butt welding) end 34 to the end of a pipe section to thereby attach ring 32 to the pipe section. FIG. 4 illustrates end 34 connected by welds 36, 38 to a second end 40 of a second pipe 42.

Typically, these rings are pre-attached to pipe lengths, a female ring 12 being at one end of the pipe length and a male ring 32 at the other end, such as by welding, prior to delivery of the pipe lengths to an installation site. Lengths of pipes with these rings are then ready to be added to a string of one or more pipes as the pipe string is being driven through the ground. Typically, although not required, ring 32 will be at the trailing end of a string of pipe sections being driven through the ground and ring 12 will be at the leading end of the next pipe section to be joined in the pipe string.

Figure 1:
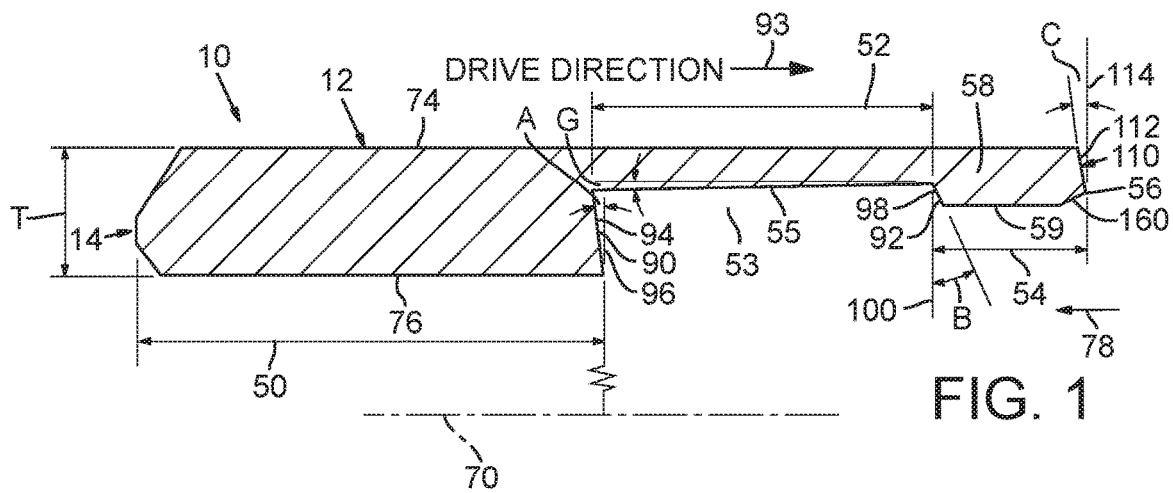
FIGS. 1 and 2 are sectional views of respective couplers in the form of annular rings or ring segments of a pipe ram joint in accordance with an exemplary embodiment of this disclosure. More specifically.
Figure 5:
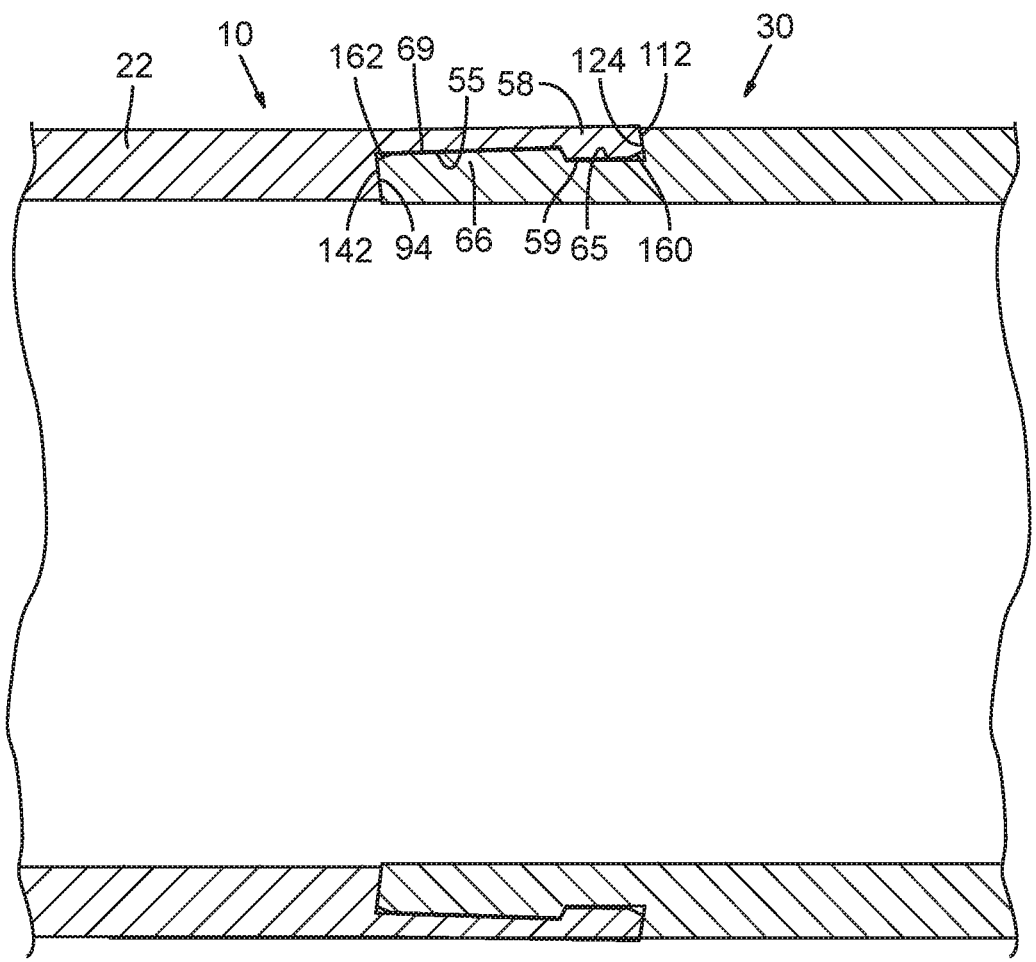
FIG. 5 illustrates an alternative embodiment wherein the respective pipe ram joint couplers are formed, as by machining, directly into the ends of two pipes that are joined together.

The inclusion of the ram joint couplers as separate rings allows for more precise machining in contrast to machining the ram joint structural components directly into the respective ends of pipe sections. However, it is to be understood that the coupling features of the rings, 12, 32 also be machined or otherwise formed directly into the ends of pipe sections, such as shown in FIG. 5. As shown in FIG. 1, ring 12 desirably has at least three main annular sections, namely, an annular first trailing coupling end section 50, a middle annular groove defining section 52 that defines a first annular groove 53, and an annular front, or first leading end section 54 comprising an annular first tooth 58. The illustrated leading end section 52 terminates in a first distal end 56. As can be seen from FIG. 2, the ring 32 desirably also has at least three main annular sections, namely, a second trailing or coupling end section 60, a middle annular groove defining section 62 that defines a second annular groove 63, and an annular front, or second leading end section 64 comprising an annular second tooth 66. The second leading end section terminates in a second distal end 68.

In the embodiment of FIGS. 1 and 2, the annular first coupler or ring 12 has a first longitudinal axis 70 coaxial with the longitudinal axis of the pipe to which the ring is coupled. The first coupler is mounted to (FIG. 4) or formed in (FIG. 5) a first end of a first pipe. In addition, an annular second coupler or ring 32 has a second longitudinal axis 72 coaxial with the longitudinal axis of the pipe to which the ring is coupled. The second coupler is mounted to (FIG. 4) or formed in (FIG. 5) a second end of a second pipe.

The ring 12 comprises the first distal end 56, an annular first outer wall 74 and an annular first inner wall 76. The walls 74, 76 are desirably circular in cross section. Desirably the diameter of inner wall 76 is the same diameter as the inner diameter of the pipe to which ring 12 is to be mounted and the diameter of the outer wall 74 is the same diameter as outer diameter of the pipe to which the ring is to be mounted. The first distal end 56 defines a first pipe receiving opening 78 that is desirably circular in cross section. The second coupler comprises the second distal end 68, an annular second outer wall 80 and an annular second inner wall 82. The walls 80, 82 are desirably circular in cross section. Desirably the diameter of inner wall 82 is the same diameter as the inner diameter of the pipe to which ring 30 is to be mounted and the diameter of the outer wall 80 is the same diameter as outer diameter of the pipe to which the ring is to be mounted. However, the rings can have a thickness that is greater than the thickness of the adjoining pipes, such that, for example, the OD dimension of the rings is greater than the OD dimension of the connected pipes. Typically, although not necessarily, the ID dimension of the rings matches the ID dimension of the pipes. The second distal end 68 and the second coupler are sized for insertion into the first pipe receiving opening 78 and into the first ring 12 to position the first tooth 58 of the first ring in the second groove 63 of the second ring and the second tooth 66 of the second ring 32 in the first groove 53 of the first ring to join the first and second rings and pipes carrying these rings together.

Thus, the inner and outer diameters of coupler sections 50 and 64 are desirably the same and can be the same diameter as the diameter of the pipes to which the couplers are attached. The tooth 58 and the groove 53 are recessed into the inner wall 76 of coupler 10 with the tooth 58 having an outer tooth wall 59 that is nearer to the first longitudinal axis 70 than a base wall 55 at the base of the groove 53. The tooth 66 and the groove 63 are recessed into the outer wall 80 of coupler 30 with the tooth 66 having an outer tooth wall 67 that is further from the second longitudinal axis 72 than a base wall 65 at the base of the groove 63.

The first inner wall 76 thus comprises an annular first groove 53 spaced from the first distal end 56, and an annular first tooth 58 positioned nearer to the first distal end 56 than the distance from the first annular groove 53 to the distal end 56.

The first groove is defined by a first annular groove side wall 90, the base wall 55 and a second annular groove side wall 92. The side wall 92 leads the side wall 90 if ring 12 in the direction of motion if the ring 12 is moved in the drive direction indicated by arrow 93 in FIG. 1. The drive direction 93 in FIGS. 1 and 2 corresponds to an exemplary direction that a pipe string is being driven into the ground. As can be seen in FIG. 1, the first groove side wall 90 is spaced further from the first distal end 56 than the second groove side wall 92.

The illustrated first groove side wall 90 has an annular first face or first surface 94 that is undercut and angled toward the distal end 56 and that faces the drive direction of motion of ring 12. That is, the first groove side wall 94 and its associated surface 94 is angled toward the first distal end at a first acute angle A relative to a plane 96 that is perpendicular to the first longitudinal axis 70 and moving away in a direction from the first groove base wall 55. The second groove side wall 90 has an annular second face or associated surface 98 that is angled toward the distal end 56 moving away from the base wall 55. That is, the second groove side wall and surface 98 is angled toward the first distal end at a second acute angle B relative to a plane 100 that is perpendicular to the first longitudinal axis 70 and moving in a direction away from the first groove base wall 55.

The illustrated the first tooth 58 is bounded by first and second annular tooth side walls respectively at opposite ends of the first tooth outer wall 59. In FIG. 1, the first tooth first side wall of tooth 58 is also the second groove side wall 92 is positioned further from the first distal end 56 than the second tooth side wall 110. At least a portion 112 of the second tooth side wall 110 comprises an annular first tooth side wall groove wall engaging surface. The surface 112 is angled toward the distal end 56 of the first tooth 58 at a third acute angle C relative to a plane 114 perpendicular to the first longitudinal axis 70 and moving in a direction away from the first outer wall 74.

The second outer wall 80 thus comprises an annular second groove 63 spaced from the second distal end 68, and an annular second tooth 66 positioned nearer to the second distal end 68 than the distance from the second annular groove 63 to the distal end 68. As can be seen in FIGS. 1 and 2, the second tooth 66 desirably has a longer length (the length of section 64, the length dimension being in the direction of the longitudinal axis 72) than the length of the first tooth 58 (the length of section 54, the length dimension being in the direction of the longitudinal axis 70).

The second groove is defined by a third annular groove side wall 120, the base wall 65 and a fourth annular groove side wall 122. The side wall 122 leads the side wall 120 if ring the 32 is moved in the drive direction indicated by arrow 93. As can be seen in FIG. 2, the third groove side wall 120 is spaced nearer to the second distal end 68 than the fourth groove side wall 122.

The illustrated fourth groove side wall 122 has an annular fourth face or associated fourth surface 124 that is undercut and angled toward the distal end 68 and that faces away from drive direction 93. That is, the fourth groove side wall 122 and surface 124 is desirably angled toward the second distal end 68 at a fourth acute angle D relative to a plane 126 that is perpendicular to the second longitudinal axis 72 moving away from the second groove base wall 65. The third groove side wall 120 has an annular third face or associated surface 128 that is angled toward the distal end 68 moving away from the base wall 65. That is, the third groove side wall 120 and surface 128 are angled toward the second distal end 68 at a third acute angle E relative to a plane 130 that is perpendicular to the second longitudinal axis 72 moving away from the second groove base wall 65.

The illustrated the second tooth 66 is bounded by first and second annular tooth side walls respectively at opposite ends of a second tooth outer wall 69. In FIG. 2, the first tooth side wall of tooth 66 is also the third groove side wall 120 (angled at angel E as explained above) in this embodiment. The first tooth side wall of tooth 66 is positioned further from the first distal end 68 than a second tooth side wall 140. At least a portion 142 of the second tooth side wall 140 desirably comprises an annular a second tooth side wall groove wall engaging surface. The surface 142 in this exemplary embodiment is angled toward the distal end 68 of the second tooth 66 at an acute angle F relative to a plane 144 that is perpendicular to the second longitudinal axis 72 in a direction moving away from the second inner wall 82.

As can be seen in FIGS. 4 and 5, the first tooth 58 is sized for positioning in the second groove 63 with at least a portion of the first side wall groove wall engaging surface 112 abutting the fourth groove side wall 122 and surface 124. In addition, the second tooth 66 is sized for positioning in the first groove 53 with at least a portion of the second tooth side wall groove wall engaging surface 142 abutting the first side wall 90 and surface 94. The length of tooth base wall 59 of the first tooth can be the same as the length of the second groove base wall 65. However, the first tooth base wall 59 length can be longer than the second groove base wall 65, as explained below in connection with FIGS. 7-9 (for example several thousandths of an inch longer) so that when the first tooth 58 fits within the second groove 63 a gap (e.g. of several thousandths of an inch) is provided between the first tooth outer wall 59 and the second groove base wall 65. This gap is expected to reduce the friction between these two surfaces during ramming of the joints together. In addition, the angles B and E can be the same (such as twenty-five to thirty-five degrees, with thirty degrees being one example) and greater than the angles C and D. Also, the angles A, F and C, D can be the same (such as from four to fifteen degrees with ten degrees being one specific example in the FIG. 1 embodiment). However, these angles A, F; C, D; and B, E; can be different from one another. For example, as explained below in connection with FIGS. 7-9, angle C can be less than angle D, such as ten percent less. This reduces the bearing surface of the first side wall groove engaging surface 112 against the fourth groove side wall 122.

Also, the sum of: (a) the thicknesses of the first ring 12 from the first tooth outer wall 59 to the first outer wall 74 in the radial direction away from longitudinal axis 70; and (b) the thickness of the second ring 32 from the base wall 65 of the second groove 63 to the second inner wall 82 of the second ring, can be equal to the thickness of the T between the inner and outer walls of the rings 12, 32 and the thickness of the pipes to which the rings are attached. However, the thickness of the rings can be greater than the thickness of the pipes. Also, although variable, the thickness of the first ring 12 along the length of the first groove 53, can be, for example, about ten to thirty percent of the thickness T. As a specific example, for a sixty inch diameter pipe, T can be 1.25 inches. In addition, the sum of: (a) the thicknesses of the second ring 32 from the second tooth outer wall 69 to the second inner wall 82 in the radial direction away from longitudinal axis 72; and (b) the thickness of the first 12 from the base wall 55 of the first groove 53 to the first outer wall 74 of the first ring, can be equal to the thickness T between the inner and outer walls of the rings 12, 32 and the thickness of the pipes to which the rings are attached. Also, although variable, the thickness of the second ring 12 along the length of the second groove 63, can be, for example, about forty to sixty percent of the thickness T.

With reference to FIG. 1, at least a portion of the surface of first groove base wall 55 desirably diverges in this embodiment from the first longitudinal axis 70 in a direction from the first groove side wall 90 toward the second groove side wall 92. The entire length of the base wall surface 65 can diverge in this manner along its length. Thus the radius of at least a first portion of the first groove 53 from the first longitudinal axis 70 increases at a first rate moving from the first groove side wall toward the second groove side wall along the first portion of the base wall 55 of the first groove 53. This is indicated by the slope of acute angle G in FIG. 1. With reference to FIG. 2, at least a second portion of the surface of second tooth outer wall 69 desirably diverges in this embodiment from the second longitudinal axis 70 in a direction from the second tooth side wall 140 to the second tooth side wall 120. The entire length of the second outer tooth wall surface 69 can diverge in this manner along its length. Thus the radius of at least a first portion of the second tooth outer wall from the second longitudinal axis 72 increases at a second rate moving from the second tooth side wall 140 toward the second tooth side wall 120 along a portion of the second tooth outer wall 69. This is indicated by the slope of acute angle H in FIG. 2. The surface 69 in FIG. 2 can thus comprise an annular tapering surface. In this example, the thickness of tooth 66 can progressively become thinner moving toward the distal end 68. In the illustrated example, this tapering can be continuous until a chamfered portion 162 is reached.

The angle H can be greater than the angle G as this is understood to reduce the force required to ram the coupling rings together. That is, the second rate can be greater than the first rate. Thus, the radius of at least a second portion of the second tooth from the second longitudinal axis increases at a second rate that is greater than the first rate moving from the fourth tooth side wall surface 142 toward the third tooth side wall surface 128 along the second portion of the second tooth. As a specific example, and although variable, the angle H can be from one-half to three degrees, with two degrees being a specific example and the angle G can be from one-half to two and one-half degrees, with one degree being a specific example.

As can be seen in FIG. 1, the first leading face or surface 94 is located at the forward or leading end of section 50 of ring 12, adjacent to and at the transition to middle section 52. As used herein, "leading face" refers to a face that is facing toward the drive direction 93, while a "trailing face" refers to a face that is facing away from the drive direction 93. The first leading face 94 is angled to make contact with a trailing face or surface 142 of the second ring 32 when the rings are rammed together (such as shown in FIGS. 4 and 5) to join the pipe sections to which the rings are attached or in which the coupling elements of the rings are formed. It should be noted that a combination of rings formed into pipe ends and rings attached to pipe sections can be used. For example, only one type of ring 12, 32 can be formed in the one end of a pipe section with the other type of ring being a separate ring mounted to the opposite end of the pipe section or as formed into the opposite end. As explained above, desirably, in the example shown in FIGS. 1 and 2, first leading face 94 is annular and is angled at an acute angle A relative to a transverse plane 96 perpendicular to the longitudinal axis 70. The surface 94 is oriented to slant in a direction opposite to the drive direction 93 moving from the inner wall surface 76 toward the outer wall surface 74.

As can be seen in FIG. 2, ring 32 comprises a first trailing face 122 that is annular and is angled at the acute angle D relative to a transverse plane 126 perpendicular to the second longitudinal axis 72 and also perpendicular to the drive direction 93. The surface 122 of ring section 32 is oriented to slant in a direction opposite to the drive direction 93 moving from the inner wall 82 toward the outer wall 80 of ring section 32. The engaging faces 112, 122, and the respective acute angles of these surfaces result in the joint becoming tighter as ring 12 is driving onto ring 32 and these rings are driven together by impacting the tail end of the pipe of a pipe string containing the joint comprising ring sections 12 and 32.

The middle section 52 of ring section 12 defines the annular groove 53. The middle section 52 is thinner than rear end section 50, such as being about one-third of the thickness of the rear end section 52.

As shown in FIG. 1, the inner surface of the groove 53, that is the groove base wall 55, can taper moving toward leading or front ring section 54 and, in this example, the pipe wall becomes thinner moving in this direction in the exemplary embodiment.

With further reference to FIG. 1, the distal end portion of ring 12, namely the inner wall of the front end section 54, comprises the annular first tooth portion 58. The tooth portion 58 projects inwardly away from the outer wall 74 of ring section 12. Tooth 58 is in effect cantilevered by middle section or portion 52 from the rear end section 50 of the ring 12.

In the illustrated example, the tooth 58 comprises the trailing face 98 and leading face 112. The distal interior peripheral edge 160 of the tooth 58, and/or the distal exterior peripheral edge 162 of tooth 66, can be beveled or chamfered to facilitate insertion of the ring 32 into the opening 78 of the ring 12 as pipes with the mounted and/or formed rings 12, 32, are brought together. With this configuration, when the mounted or formed rings 12, 32 are driven together by applying force in the drive direction to an exposed end of a pipe section, the tooth 58 is driven deeper into the groove 63 with the driving forces being transmitted via the engaged surfaces 112, 124 to a leading section of pipe of a pipe string to thereby enhance pipe ramming and driving. As the pipe sections are driven further into the ground, the tooth 58 is driven into further engagement within the groove 63 until a maximum engaged position is reached. The corresponding lagging face 128 of groove 63 desirably abuts the lagging face 98 of tooth 58 when the tooth 58 is positioned in the groove 63. At the same time, the tooth 66 is driven into the groove 53 with lagging face 142 of the tooth 66 engaging the lagging face 96 of the groove 53.

FIG. 3 illustrates ring section 12 and ring section 32 as these two ring sections are being driven together by applying an impact force in the drive direction to the end of the pipe containing ring section 12. As the ring elements are rammed together, the outer wall 59 of tooth 58 engages and slides along the outer wall 69 of the tooth 66 with the tooth 58 moving toward the second groove 63. As the tooth 66 enters the second groove 53, the surface 69 in embodiments where angle H is greater than angle G, is spaced from the surface 55 due to the difference between the angle G and the angle H, which assists in reducing the required ramming force. A lubricant, such as a silicon sealant, can be placed between the sliding surfaces to facilitate sliding of the engaged surfaces. In one typical installation approach, a female ring coupler 10 is brought toward the male ring coupler 30 projecting from the ground. The pipe with the female ring coupler is angled such that the top or bottom portion of the female coupler first engages the corresponding portion of the exposed male coupler. The pipe with the female coupler is then tilted to align the couplers and the female coupler is rammed into the male coupler. A temporary push ring is typically placed onto the male coupler at the opposite end of the pipe with the female coupler for use during the connection and ramming operation to protect the male coupler.

FIGS. 4 and 5 illustrate the ring sections 12 and 32 in an interconnected position with tooth 58 positioned within groove 63 and tooth 66 positioned within groove 53. As previously mentioned, during ramming, the tooth 58 is driven deeper into the recess or groove 63 leading to a tighter fit and a more efficiently functioning joint as energy is more effectively transferred through the joint toward the leading end of the string of pipes being driven into the soil.

As also shown in FIG. 4, as ring 12 and ring 32 pressed together, because of the angled faces that the chamfers 160, 162 (in embodiments with such chamfering) provided at the respective ends of the ring sections, a first gap or recess is provided by the chamfer 160 at the base of the groove 53 adjacent to the abutting surfaces 94, 142 and a second recess or gap 32 is provided at the base of the groove 63 adjacent to the abutting surfaces 112, 122. These gaps relieve stresses at these locations of the joint.

FIG. 5 illustrates an alternative embodiment in which the structural features of ring components 12, 32 as is described in connection with FIGS. 1 and 2 (except for the weld coupling portions) are machined into the ends of respective pipe sections rather than being provided in rings that are attached to pipe lengths. In this embodiment, the structural features of coupler 10, with the exception of the welding features at the end 14 of the ring, are machined into an end of the first pipe 22. Similarly, the structural features of coupler 30, with the exception of the welding features at the end 34 of ring 32, are machined into an end of a second pipe 42. The pipe sections 22, 42 are shown rammed together to form the joint between the couplers 10, 30.

In the embodiment of FIGS. 6-12, elements in common with the elements of the embodiment of FIGS. 1-5 have been given the same numbers, to which the above description applies, except as differences are noted in the description below. These common elements will not be discussed further except as appropriate to describe the differences between these embodiments. It is expected that the embodiment of FIGS. 6-12 will require a lesser ramming force to ram the couplers together than the ramming force required to ram the couplers of the embodiment of FIGS. 1-5 together. The elements of the couplers of FIGS. 6-12 can be provided in rings mounted to the ends of pipes or formed into pipe ends as explained above.

Figure 10:
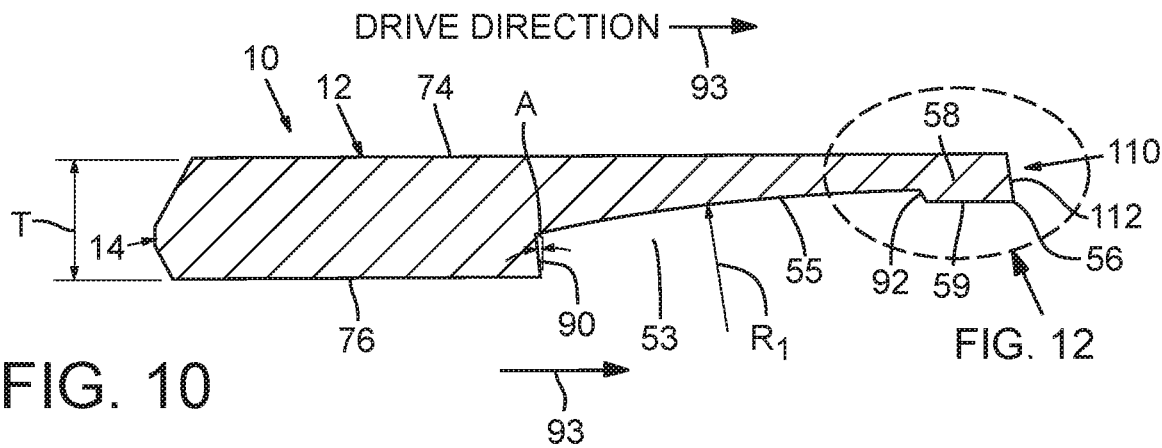
FIG. 10 illustrates a more detailed view of the female ring of FIG. 6.
Figure 11:
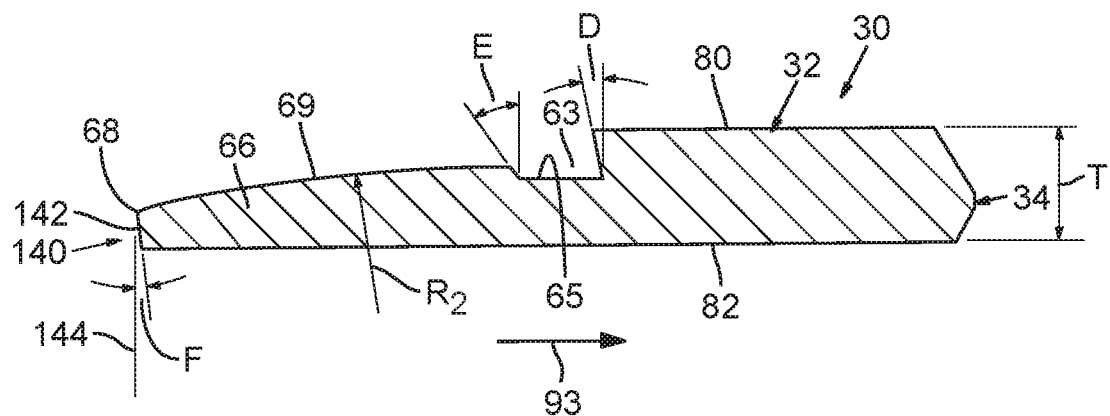
FIG. 11 illustrates a more detailed view of the male ring of FIG. 6.
Figure 12:
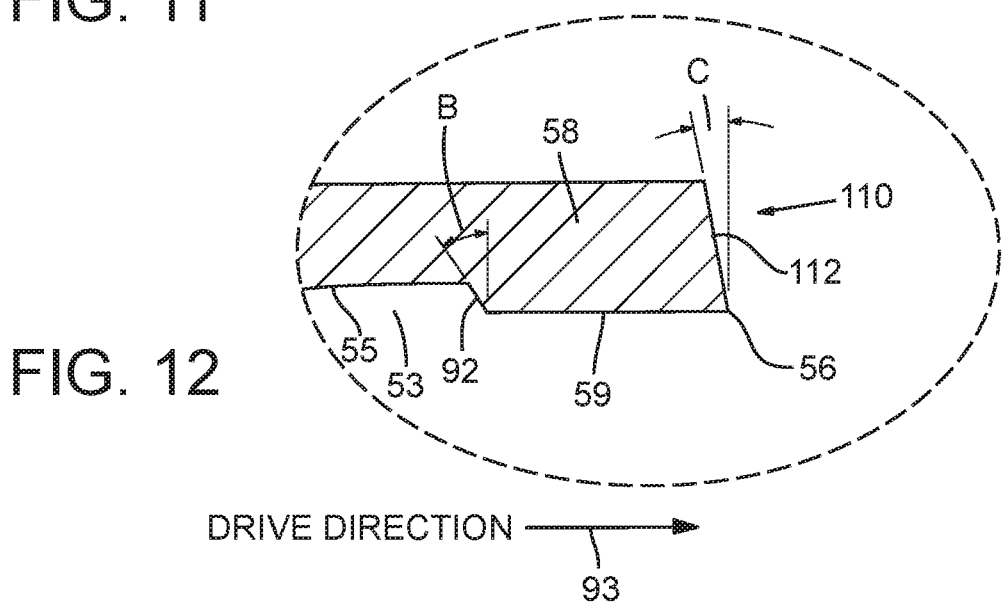
FIG. 12 illustrates an enlarged view of the tooth of FIG. 10.

With reference to FIGS. 10-12, in this embodiment, at least the majority of the first groove base wall 55 is concave and at least a majority of the second tooth outer wall 69 is convex. More desirably, the entire length of the base wall 55 can be concave and the entire length of the second tooth outer wall 69 can be convex. The surfaces 55 and 69 are shown with respective radii R1 and R2. Although they can be different, R1 and R2 can be the same, such as between eighteen and twenty-five inches, with twenty-one inches being one exemplary radii dimension. The concave surface 69 facilitates the sliding of the tooth surface 59 along this surface and is expected to reduce the ramming force required to urge the tooth 58 into the second groove 63. In addition, the concave surface 55 facilitates the sliding of surface 69 into the groove 53.

In the FIGS. 10-12 embodiment, the angles A and F can be less than in the FIGS. 1 and 2 embodiment, such as from four to eight degrees, with six degrees being a specific example.

Referring to FIG. 12, in this embodiment the tooth 58 has been modified. More specifically, although not required, the first side wall groove engaging surface 112 has been expanded to cover the entire tooth wall 110 of the tooth. In addition, the chamfer 160 has been eliminated and replaced with a pointed tip at the first distal end 56, which is typically polished to provide a small radius of curvature to the tip, such as less than a 0.2 inch radius.

In addition, although the angles and dimensions of the FIGS. 6-12 embodiment can be like those of the FIGS. 1-5 embodiment, the angle C in the FIGS. 6-12 embodiment can be made smaller than the angle D, such as five to twenty percent smaller, with a ten percent reduction being a specific example. For example, the angle C can be nine degrees and the angle D can be ten degrees. In addition, the length dimension of tooth outer wall 59 in the drive direction 93 can be made longer than the length dimension of the base wall 65 of the groove 63.

Figure 7:
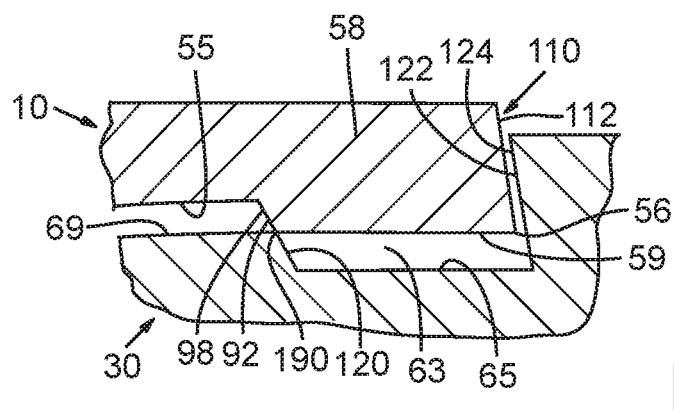
FIG. 7 illustrates a tooth of the female ring of FIG. 6 as it reaches a tooth receiving groove of the male ring of FIG. 7.
Figure 8:
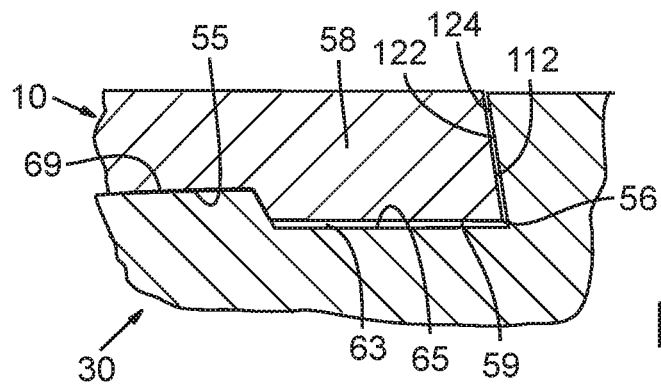
FIG. 8 illustrates the tooth of FIG. 7 at a further position of advancement into the tooth receiving groove.
Figure 9:
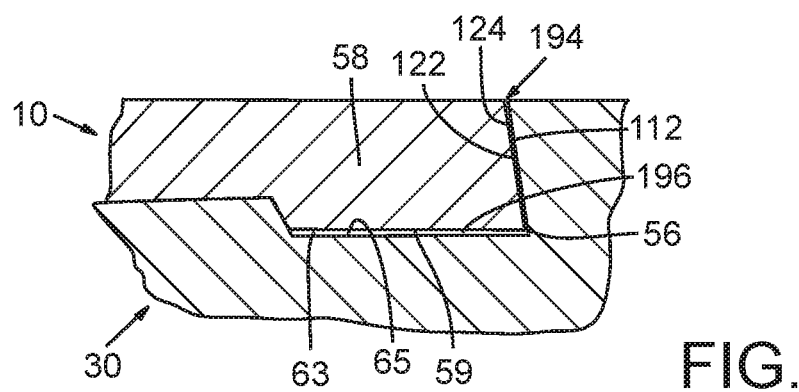
FIG. 9 illustrates the tooth of FIG. 7 in the tooth receiving groove with a portion of the leading face of the tooth abutting the trailing face of the tooth receiving groove.

With reference to FIGS. 7-9, the progress of tooth 58 into the groove 63 is shown. In FIG. 7, the tooth 58 has advanced to the location where a tooth corner 190 between surfaces 59 and 98 is at the lagging edge of the groove 63 at the top of groove wall 120. A gap exists between leading tooth surface 112 and the groove side wall surface 124. In FIG. 8, the tooth 158 has entered the groove 63. In FIG. 9, the tooth 58 is fully positioned in the groove 63. In an example where the angle C is less than the angle D, as shown in FIG. 9, the distal end 56 comprises at least a portion of the first groove side wall engaging surface that engages wall surface 124, but a gap 194 exists between the upper portion of surface 112 and the groove side wall surface 124. As a result, there is less resistance as the ring 12 is driven into the ring 32 and the distal end 56 slides along the surface 122 to its final position, in comparison to an example embodiment wherein the angles C and D are equal and the entire surface 112 abuts the surface 124.

In addition, in an embodiment where the length of tooth outer wall 59 is longer than the length of groove base wall 65, in the final position shown in FIG. 9, a gap 196 exists between the surfaces 59 and 65. As a result, these surfaces do not bear against one another as the couplers are driven together, which also is expected to reduce the ramming force required to drive the couplers together and to reduce or eliminate "bounce back"; the recoil energy of the pipe that otherwise would tend to force the pipe joint apart after ramming impact as the pipe string is advanced through the soil and also during joint formation.

Figure 6:
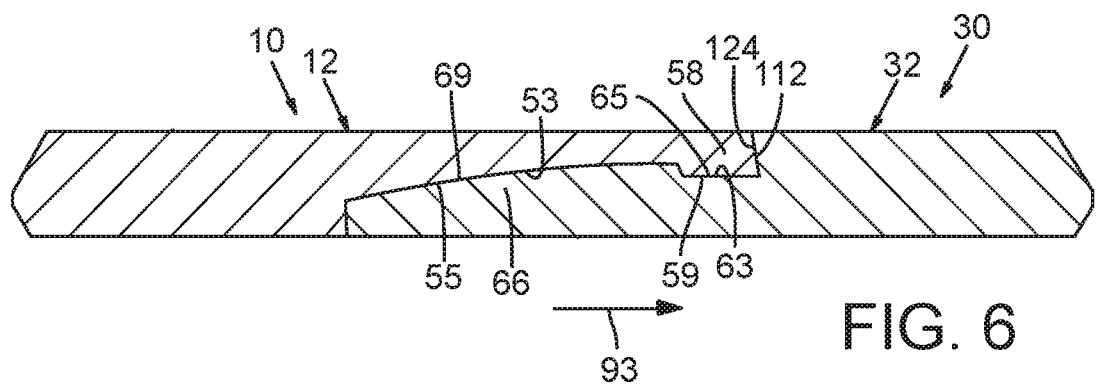
FIG. 6 illustrates another embodiment of female and male couplers, in the form of annular rings, following their interconnection to form a pipe ram joint; it being understood that, for convenience, the pipes attached to these rings are not shown.

FIG. 6 illustrates the couplers 10, 30 of FIGS. 10 and 11 after they have been driven together.

In view of the many possible embodiments to which the principles of the disclosed invention may be applied, it should be recognized that the illustrated embodiments are only examples and should not be taken as limiting the scope of this disclosure. Rather, the scope is defined by the following claims.

We claim:

1. A pipe ram joint for joining first and second pipes together, the pipe ram joint comprising:
    an annular first coupler having a first longitudinal axis, the first coupler being mounted to or formed in a first end of the first pipe, and an annular second coupler having a second longitudinal axis, the second coupler being formed in or mounted to a second end of the second pipe;
    the first coupler comprising a first distal end, an annular first outer wall and an annular first inner wall, the first distal end defining a first pipe receiving opening;
    the second coupler comprising a second distal end, an annular second outer wall and an annular second inner wall, the second distal end and second coupler being sized for insertion into the first pipe receiving opening and into the first coupler to join the first and second pipes together;
    the first inner wall comprising an annular first groove spaced from the first distal end, and an annular first tooth positioned nearer to the first distal end than the first annular groove;
    wherein the first groove has first and second annular groove side walls and a first groove base wall, the first groove side wall being further from the first distal end than the second groove side wall, wherein the first groove side wall is angled toward the first distal end at a first acute angle relative to a plane perpendicular to the first longitudinal axis in a direction moving away from the first groove base wall;
    wherein the first tooth has first and second annular tooth side walls and a first tooth outer wall, the first tooth side wall being positioned further from the first distal end than the second tooth side wall, the second tooth side wall comprising a first tooth side wall groove wall engaging surface angled toward the distal end at a third acute angle relative to a plane perpendicular to the first longitudinal axis in a direction moving away from the first outer wall;
    the second outer wall comprising an annular second groove spaced from the second distal end, and an annular second tooth positioned nearer to the second distal end than the second annular groove;
    wherein the second groove has third and fourth annular groove side walls and a second groove base wall, the fourth groove side wall being further from the second distal end than the third groove side wall, wherein the fourth groove side wall is angled toward the second distal end at a second acute angle relative to a plane perpendicular to the first longitudinal axis in a direction moving away from the second groove base wall;
    wherein the second tooth has third and fourth annular tooth side walls and a second tooth outer wall, the fourth tooth side wall being positioned further from the second distal end than the third tooth side wall, the fourth tooth side wall comprising a second tooth side wall groove wall engaging surface angled toward the distal end at a fourth acute angle relative to a plane perpendicular to the first longitudinal axis in a direction moving away from the second inner wall;

the first tooth being sized for positioning in the second groove with at least a portion of the first side wall groove wall engaging surface abutting the fourth groove side wall and the second tooth being sized for positioning in the first groove with at least a portion of the second tooth side wall groove wall engaging surface abutting the first side wall.

2. A pipe ram joint according to claim 1 wherein the first tooth has a length that is shorter than the length of the second tooth.

3. A pipe ram joint according to claim 1 wherein the radius of at least a first portion of the first groove from the first longitudinal axis increases at a first rate moving from the first groove side wall toward the second groove side wall along the first portion of the first groove and wherein the radius of at least a second portion of the second tooth from the second longitudinal axis increases at a second rate that is greater than the first rate moving from the fourth tooth surface toward the third tooth wall along the second portion of the second tooth.

4. A pipe ram joint according to claim 1 wherein the first groove base wall is sloped at a first angle away from the first longitudinal axis from the first groove side wall to the second groove side wall; and wherein the second tooth outer wall is sloped at a second angle away from the second longitudinal axis from the fourth tooth side wall toward the third tooth side wall; the second angle being greater than the first angle.

5. A pipe ram joint according to claim 1 wherein at least the majority of the first groove base wall is concave and wherein at least a majority of the second tooth outer wall is convex.

6. A pipe ram joint according to claim 1 wherein the first groove base wall is concave and the second tooth outer wall is convex.

7. A pipe ram joint according to claim 1 wherein the third acute angle of the first tooth groove wall engaging surface is less than the second acute angle of the fourth groove wall.

8. A pipe ram joint according to claim 7 wherein the third acute angle is about ninety percent of the second acute angle.

9. A pipe ram joint according to claim 1 wherein the length of the first tooth outer wall in the direction of the first longitudinal axis is greater than the length of the second groove base wall in the direction of the second longitudinal axis, wherein with the first tooth positioned in the second groove, a gap exists between the first tooth outer wall and the second groove base wall.

10. A pip ram joint according to claim 1 wherein the first and second pipes have respective first and second ends, the first coupler comprises a first ring adapted to be mounted to a first end of the first pipe and the second coupler comprises a second ring adapted to be mounted to the second end of the second pipe.

11. A pipe ram joint according to claim 1 wherein the first and second pipes have respective first and second ends, a first of the first couplers being formed in or mounted to the first end of the first pipe and a second of the first couplers being formed in or mounted to the first end of the second pipe; and a first of the second couplers being formed in or mounted to the second end of the first pipe and a second of the second couplers being formed in or mounted to the second end of the second pipe.

12. A pipe ram joint for joining first and second pipes together, the pipe ram joint comprising:

an annular first coupler having a first longitudinal axis, the first coupler being mounted to or formed in a first end of the first pipe, and an annular second coupler having a second longitudinal axis, the second coupler being formed in or mounted to a second end of the second pipe;

the first coupler comprising a first distal end, an annular first outer wall and an annular first inner wall, the first distal end defining a first pipe receiving opening;

the second coupler comprising a second distal end, an annular second outer wall and an annular second inner wall, the second distal end and second coupler being sized for insertion into the first pipe receiving opening and into the first coupler to join the first and second pipes together;

the first inner wall comprising an annular first groove spaced from the first distal end, and an annular first tooth positioned nearer to the first distal end than the first annular groove;

the first annular groove having an annular first groove side wall, an annular second groove side wall, and an annular first base wall, the first groove side wall comprising an annular first groove side wall surface and the second groove side wall comprising an annular second groove side wall surface;

wherein moving in a direction away from the first outer wall toward the first inner wall, the first groove side wall surface is angled at an acute angle relative to a plane perpendicular to the first longitudinal axis and in a direction toward the first distal end, and wherein moving in a direction away from the first outer wall toward the first inner wall, the second groove side wall surface is angled at an acute angle relative to a plane perpendicular to the first longitudinal axis and in a direction toward the first distal end;

the first tooth having an annular first tooth side wall, an annular second tooth side wall, and an annular first tooth outer wall;

wherein the first tooth side wall comprises an annular first tooth side wall surface that is the same as the second groove side wall surface, wherein the second tooth side wall comprises an annular second tooth side wall surface, wherein moving in a direction away from the first outer wall toward the first inner wall, the second tooth side wall surface is angled at an acute angle relative to a plane perpendicular to the first longitudinal axis and in a direction toward the first distal end;

the second outer wall comprising an annular second groove spaced from the second distal end, and an annular second tooth positioned nearer to the second distal end than the second annular groove;

the second annular groove having an annular third groove side wall, an annular fourth groove side wall, and an annular second base wall, the third groove side wall comprising an annular third groove side wall surface and the fourth groove side wall comprising an annular fourth groove side wall surface;

wherein moving in a direction away from the second inner wall toward the second outer wall, the third groove side wall surface is angled at an acute angle relative to a plane perpendicular to the second longitudinal axis and in a direction toward the second distal end, and wherein moving in a direction away from the second inner wall toward the second outer wall, the fourth groove side wall surface is angled at an acute angle relative to a plane perpendicular to the second longitudinal axis and in a direction toward the second distal end;

the second tooth having an annular third tooth side wall, an annular fourth tooth side wall and an annular second tooth outer wall, wherein the third side wall comprises an annular third tooth side wall surface that is the same as the third groove side wall surface, wherein the second tooth side wall comprises an annular second tooth side wall surface, wherein moving in a direction away from the second inner wall toward the second outer wall, the fourth tooth side wall surface is angled at an acute angle relative to a plane perpendicular to the second longitudinal axis and in a direction toward the second distal end; and wherein the first tooth is positioned in the second groove with at least a portion of the second tooth side wall surface abutting the fourth groove side wall surface and the second tooth is positioned in the first groove with at least a portion of the fourth tooth side wall surface abutting the first side wall groove surface to join the first and second pipes together.

13. A pipe ram joint according to claim 12 wherein the first tooth has a length that is shorter than the length of the second tooth.

14. A pipe ram joint according to claim 12 wherein at least the majority of the first groove base wall is concave and wherein at least a majority of the second tooth outer wall is convex.

15. A pipe ram joint according to claim 12 wherein the first groove base wall is concave and the second tooth outer wall is convex.

16. A pipe ram joint according to claim 12 wherein the third acute angle of the first tooth groove wall engaging surface is less than the second acute angle of the fourth groove wall.

17. A pipe ram joint according to claim 16 wherein the third acute angle is about ninety percent of the second acute angle.

18. A pipe ram joint according to claim 12 wherein the length of the first tooth outer wall in the direction of the first longitudinal axis is greater than the length of the second groove base wall in the direction of the second longitudinal axis, wherein with the first tooth positioned in the second groove, a gap exists between the first tooth outer wall and the second groove base wall.

19. A pipe ram joint according to claim 12 wherein the first and second pipes have respective first and second ends, the first coupler comprises a first ring adapted to be mounted to a first end of the first pipe and the second coupler comprises a second ring adapted to be mounted to the second end of the second pipe.

20. A pipe ram joint according to claim 12 wherein the first and second pipes have respective first and second ends, a first of the first couplers being formed in or mounted to the first end of the first pipe and a second of the first couplers being formed in or mounted to the first end of the second pipe; and a first of the second couplers being formed in or mounted to the second end of the first pipe and a second of the second couplers being formed in or mounted to the second end of the second pipe.

21. A pipe ram joint for joining first and second pipes together, the pipe ram joint comprising:

each of the first and second pipes having a first end and a second end, a respective first coupler being mounted to or formed in the first ends of each of the first and second pipes, a respective second coupler being mounted to or formed in the second ends of the first and second pipes;

each of the first couplers comprising:

a first annular ring having a first longitudinal axis, the first annular ring comprising a first distal end, an annular first outer wall and an annular first inner wall, the first distal end defining a second pipe coupler receiving opening;

the first inner wall comprising an annular first groove spaced from the first distal end, and an annular first tooth positioned nearer to the first distal end than the first annular groove;

wherein the first groove has first and second annular groove side walls and a first groove base wall, the first groove side wall being further from the first distal end than the second groove side wall, wherein the first groove side wall is angled toward the first distal end at a first acute angle relative to a plane perpendicular to the first longitudinal axis in a direction moving away from the first groove base wall;

wherein the first tooth has first and second annular tooth side walls and a first tooth outer wall, the first tooth side wall being positioned further from the first distal end than the second tooth side wall, the second tooth side wall comprising a first tooth side wall groove wall engaging surface angled toward the distal end at a third acute angle relative to a plane perpendicular to the first longitudinal axis in a direction moving away from the first outer wall; and each of the second couplers comprising:

a second annular ring having a second longitudinal axis, the annular second ring comprising a second distal end, an annular second outer wall and an annular second inner wall, the second distal end and second coupler being sized for insertion into the second pipe coupler receiving opening of the first pipe and into the first coupler to join the first and second pipes together;

the second outer wall comprising an annular second groove spaced from the second distal end, and an annular second tooth positioned nearer to the second distal end than the second annular groove;

wherein the second groove has third and fourth annular groove side walls and a second groove base wall, the fourth groove side wall being further from the second distal end than the third groove side wall, wherein the fourth groove side wall is angled toward the second distal end at a second acute angle relative to a plane perpendicular to the first longitudinal axis in a direction moving away from the second groove base wall;

wherein the second tooth has third and fourth annular tooth side walls and a second tooth outer wall, the fourth tooth side wall being positioned further from the second distal end than the third tooth side wall, the fourth tooth side wall comprising a second tooth side wall groove wall engaging surface angled toward the distal end at a fourth acute angle relative to a plane perpendicular to the first longitudinal axis in a direction moving away from the second inner wall; and wherein the first tooth of the first coupler of the first end of the first pipe is sized for positioning in the second groove of the second coupler of the second pipe with at least a portion of the first side wall groove wall engaging surface abutting the fourth groove side wall and the second tooth being sized for positioning in the first groove with at least a portion of the second tooth side wall groove wall engaging surface abutting the first side wall to thereby join the first and second pipes together.

22. A pipe ram joint according to claim 21 wherein a majority of the first groove base wall is concave and wherein a majority of the second groove base wall is convex.

23. A pipe ram joint for joining first and second pipes together, the pipe ram joint comprising:
- an annular first ring comprising first and second ends, a first outer wall and a first inner wall, the first end for mounting to an end of the first pipe and the second end defining a first ring receiving opening, the first ring having a first longitudinal axis;
- an annular second ring comprising third and fourth ends, a second outer wall and a second inner wall, the third end for mounting to an end of the second pipe and the fourth end being sized for insertion into the first ring receiving opening, the second ring having a second longitudinal axis;
- the first and second rings being driven together in response to a driving force applied to the first pipe in a drive direction that drives the first ring relative to the second ring in a drive direction that inserts the fourth end of the second ring deeper into the first ring receiving opening;
- the first ring comprising a first coupling portion adjacent to the first end of the first ring, the first inner wall comprising a first annular groove defining portion and an annular projecting first tooth portion adjacent to the second end of the first ring, the first annular groove defining portion being bounded at one side adjacent to the first coupling portion by an annular first face, at a base by an annular first wall, and at a second side adjacent to the second end portion by an annular second face, the first face being angled at an acute angle relative to a plane perpendicular to the first longitudinal axis and away from the second end of the first ring, the second face being angled at an acute angle relative to a plane perpendicular to the first longitudinal axis and away from the second end of the first ring, and wherein the first tooth portion comprises an annular first tooth end face spaced from the second face and angled at an acute angle relative to a plane perpendicular to the first longitudinal axis and away from the second end of the first ring;
- the second ring comprising a second coupling portion adjacent to the third end of the second ring, the second inner wall comprising a second annular groove defining portion and an annular second tooth portion adjacent to the fourth end of the second ring, the second groove defining portion being bounded at one side adjacent to the second coupling portion by an annular third face, at a base by an annular second wall, and at a second side adjacent to the fourth end portion by an annular fourth face, the third face being angled at an acute angle relative to a plane perpendicular to the second longitudinal axis and toward the fourth end of the second ring, the fourth face being angled at an acute angle relative to a plane perpendicular to the second longitudinal axis and away from the fourth end of the first ring, and wherein the second tooth portion comprises an annular second tooth end face spaced from the fourth face and angled at an acute angle relative to a plane perpendicular to the first longitudinal axis and toward from the fourth end of the second ring; and
- wherein the first tooth portion is positioned in the second groove portion with the first tooth end face abutting the third ring face and the second tooth portion is positioned in the first groove portion with the second tooth end face abutting the first ring face upon joining the first and second rings together.

24. A pipe ram joint according to claim 23 wherein the first wall is at a first acute wall angle relative to the first longitudinal axis and diverges from the first outer wall moving in a direction from the second end toward the first end of the first ring, the second tooth portion having an interior second tooth wall surface that is at a second acute tooth surface angle relative to the second longitudinal axis, the second acute tooth wall surface converging toward the second outer wall surface moving in a direction from the third end toward the fourth end.

25. A pipe ram joint according to claim 24 wherein the first acute wall angle is less than the second acute tooth surface angle.

26. A pipe ram joint according to claim 25 wherein the first acute wall angle is from 0.5 degrees to 2 degrees and the second acute tooth surface angle is from 1 to three degrees.

27. A pipe ram joint according to any one of the claim 26 wherein the annular first groove becomes deeper moving from the second end toward the first end of the first ring, and wherein the second tooth becomes thinner moving from the third end toward the fourth end.

28. A pipe ram joint according to claim 27 wherein the rate of increase in the depth of the annular first groove moving from the second end toward the first end is less that the rate that the second tooth becomes thinner moving from the third end toward the fourth end.

29. A pipe ram joint according to claim 28 wherein the rate of change of the depth of the annular first groove is constant and the rate at which the second tooth becomes thinner is constant.

30. A pipe ram joint according to claim 28 wherein the annular first wall is concave and the annular second wall is convex.

* * * * *